(12) United States Patent
Bühler

(10) Patent No.: US 7,355,501 B2
(45) Date of Patent: Apr. 8, 2008

(54) EVALUATION DEVICE AND VIBRATION DAMPER FOR A RACKET

(75) Inventor: Philipp Bühler, Zürich (CH)

(73) Assignee: Mecos Traxler AG, Winterthur (CH)

( * ) Notice: Subject to any disclaimer, the term of this patent is extended or adjusted under 35 U.S.C. 154(b) by 220 days.

(21) Appl. No.: 10/535,254

(22) PCT Filed: Nov. 6, 2003

(86) PCT No.: PCT/CH03/00726

§ 371 (c)(1),
(2), (4) Date: May 18, 2005

(87) PCT Pub. No.: WO2004/058364

PCT Pub. Date: Jul. 15, 2004

(65) Prior Publication Data

US 2006/0152320 A1 Jul. 13, 2006

(30) Foreign Application Priority Data

Nov. 22, 2002 (EP) .................................. 02406013

(51) Int. Cl.
*H01F 5/00* (2006.01)
(52) U.S. Cl. .................................... 336/200
(58) Field of Classification Search ........ 336/131–136, 336/200, 232, 174, 175
See application file for complete search history.

(56) References Cited

U.S. PATENT DOCUMENTS

| | | | | | |
|---|---|---|---|---|---|
| 3,270,260 | A | * | 8/1966 | Mehr | 361/300 |
| 4,421,997 | A | * | 12/1983 | Forys | 310/12 |
| 4,434,412 | A | * | 2/1984 | Ruumpol | 336/134 |
| 4,642,595 | A | | 2/1987 | Ruumpol | |
| 4,658,658 | A | | 4/1987 | Fremerey et al. | |
| 4,806,896 | A | * | 2/1989 | Shikano et al. | 336/73 |
| 4,825,157 | A | | 4/1989 | Mikan | |
| 4,879,556 | A | * | 11/1989 | Duimel | 341/20 |
| 4,939,400 | A | * | 7/1990 | Matsushita et al. | 310/208 |

FOREIGN PATENT DOCUMENTS

GB 2 310 499 A 8/1997

* cited by examiner

*Primary Examiner*—Tuyen T. Nguyen
(74) *Attorney, Agent, or Firm*—Browdy and Neimark P.L.L.C.

(57) ABSTRACT

A device for contact-less measurement of distances (10, 20) in multiple directions of an electrically conductive body (2, 22) comprises a plurality of inductive elements (1, 4, 7). At least one (1) of the plurality of inductive elements (1, 4, 7) is placed essentially around the body (2). The other inductive ele-ments or other magnetic field sensors (4, 7) are provided in the vicinity of said one inductive element (1). The device with these features allows integrating a multi axis inductive sensor on a single circuit board.

13 Claims, 11 Drawing Sheets

EVALUATION DEVICE AND VIBRATION DAMPER FOR A RACKET

Figure 1:
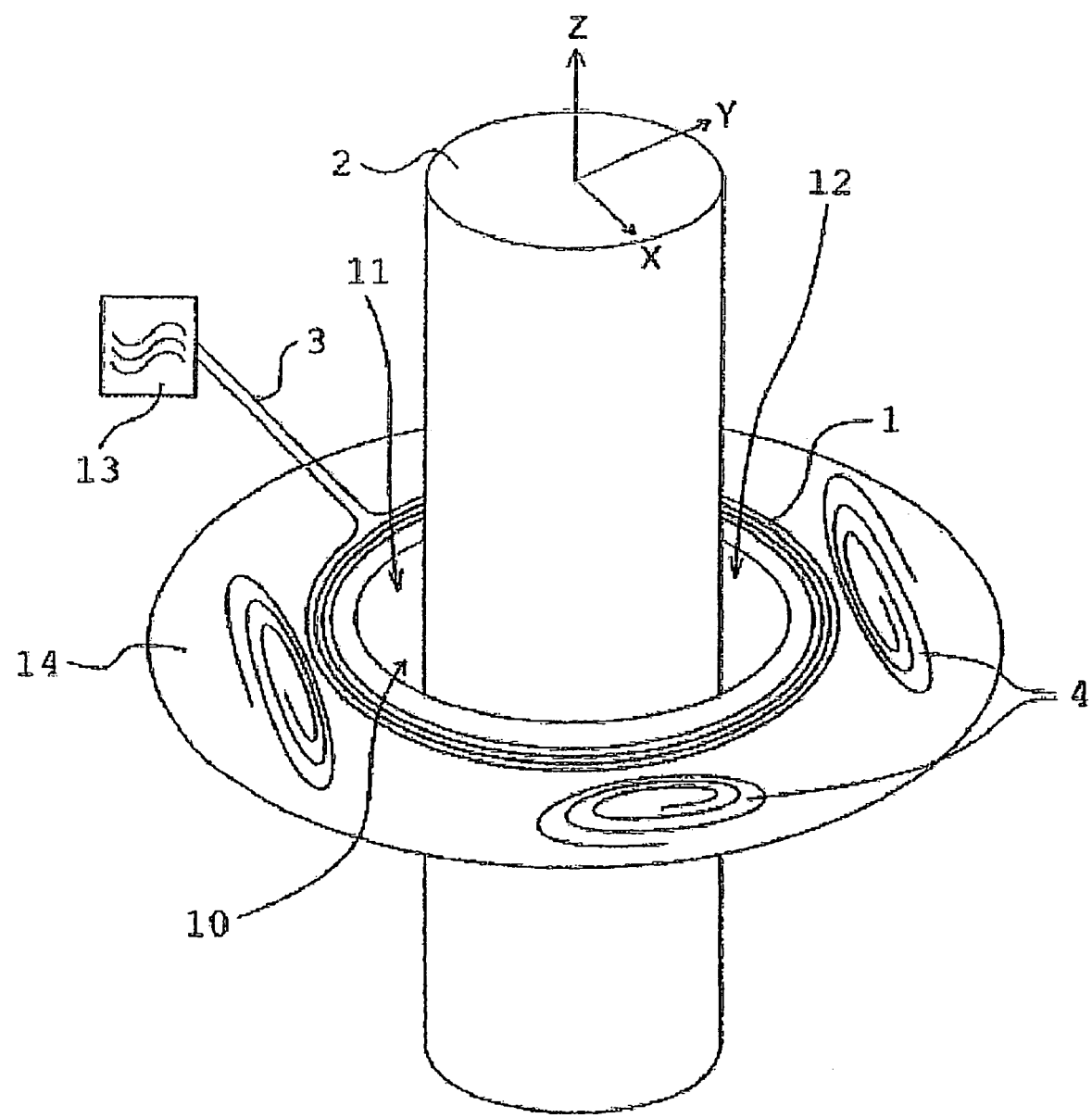

The invention relates to a device for contact-less measurement of distances in multiple directions and especially to a multi-axis position sensor.

For contact-less position measurement inductive sensors can be used. The operation principle of such sensors is based on the measurement of a sensor coil's inductance or damping that depend on the distance between sensor and a target body. Depending of the target material (ferromagnetic or electrically conductive, or both) and the measurement frequency the coil's inductance or the damping can be the dominant effect.

To obtain high reproducibility at low cost flat sensor coils can be integrated on a circuit board. Sensors according to prior art using flat coils show high position sensitivity perpendicular to the sensor coil plane. A measurement of lateral x- and y-positions within the sensor coil plane turns out to be difficult. To integrate a multi axis inductive sensor for measurement of distances in multiple directions on a single circuit board the coil windings must be concentrated close to the edges of the circuit board where the target body is located in order to obtain a sufficiently large sensitivity. However, when using a circuit board, the windings will always be spread on the surface in order to get a sufficiently high number of turns. Therefore, either inductance or sensitivity of this arrangement will be low, and, correspondingly, the integration of sensors on a single circuit board cannot be considered satisfactory.

U.S. Pat. No. 4,642,595 discloses a joystick with a concentric coil around the body, formed as a core made of ferrite material, and a number of additional coils beside the main coil.

U.S. Pat. No. 4,825,157 discloses another joystick working as a hall sensor and using a magnetic core. Both prior art documents disclose the use of a magnetic and not-conductive core body.

According to said prior art it is an object of the invention to overcome said disadvantages.

In this invention, a solution to these problems is found, allowing to integrate a multi axis inductive sensor on a single circuit board.

Various embodiments according to the subclaims comprise further advantages in the application of these sensors.

Several inductances, typically realized as coils, are arranged in such a way that the position of a target body can be measured. Position measurement in this context refers to the measurement of all rotations and translations the body can perform in space. Depending on the arrangement one, two or up to all six axes can be measured simultaneously. In case of a rotationally symmetric body, the rotation about its axis of symmetry cannot be measured (5 degree of freedom (DOF) measurement). In contrast to most other known devices in this area the rotation about its axis of symmetry is considered less important.

Within the solutions of the prior art as in U.S. Pat. No. 4,642,595 the magnetic field is guided within the magnetic body. If the body is moving in one direction (e.g. to the left) the detector on said side is nearer to the ferrite core and sees a larger magnetic field.

According to the invention the rotor is made of a full conductive cylinder, e.g. steel or aluminum. Eddy currents avoid that a magnetic field exists within said material. Therefore, if the body is moving in one direction (e.g. to the left) the magnetic field is partially suppressed on said side by the eddy currents of the target body. The overall magnetic field moves to the opposite direction (e.g. to the right). The detector on the opposite side receives the larger signal. If the gap between the concentric coil and the target body is small compared to its diameter, the movement of the overall magnetic field is much larger than the movement of the target body. This leads to a high sensitivity.

Figure 2:
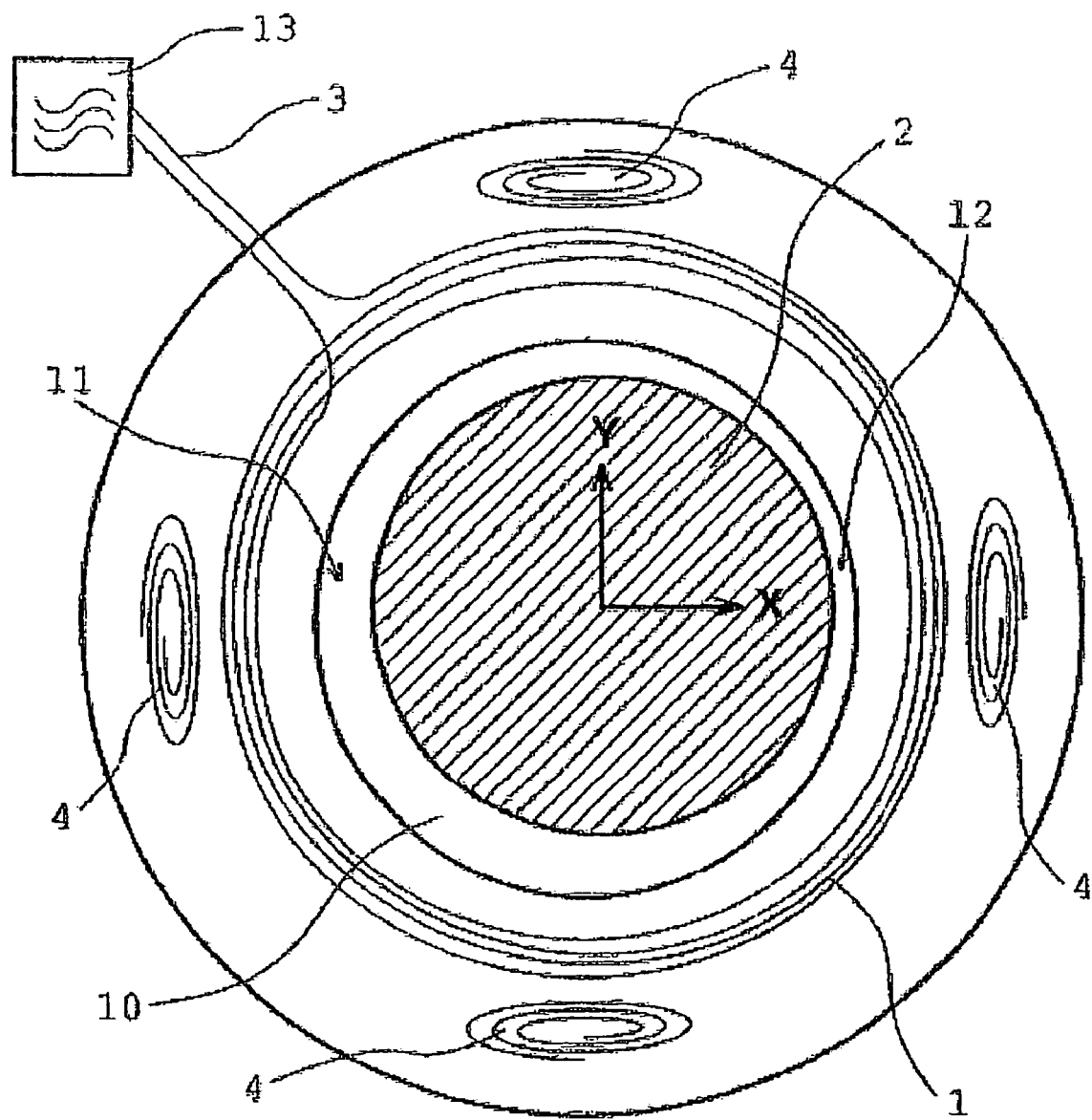
Figure 3:
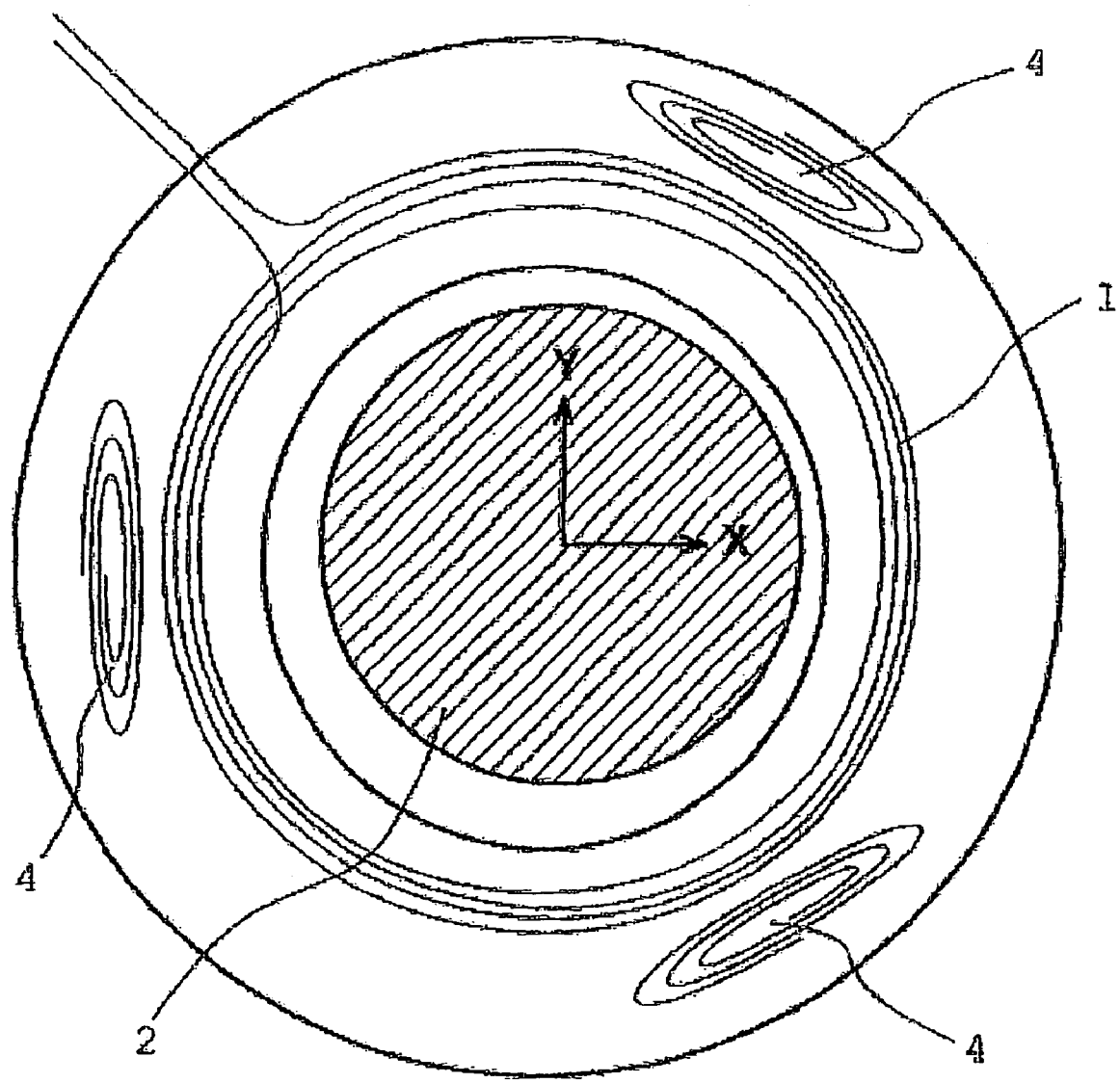
Figure 4:
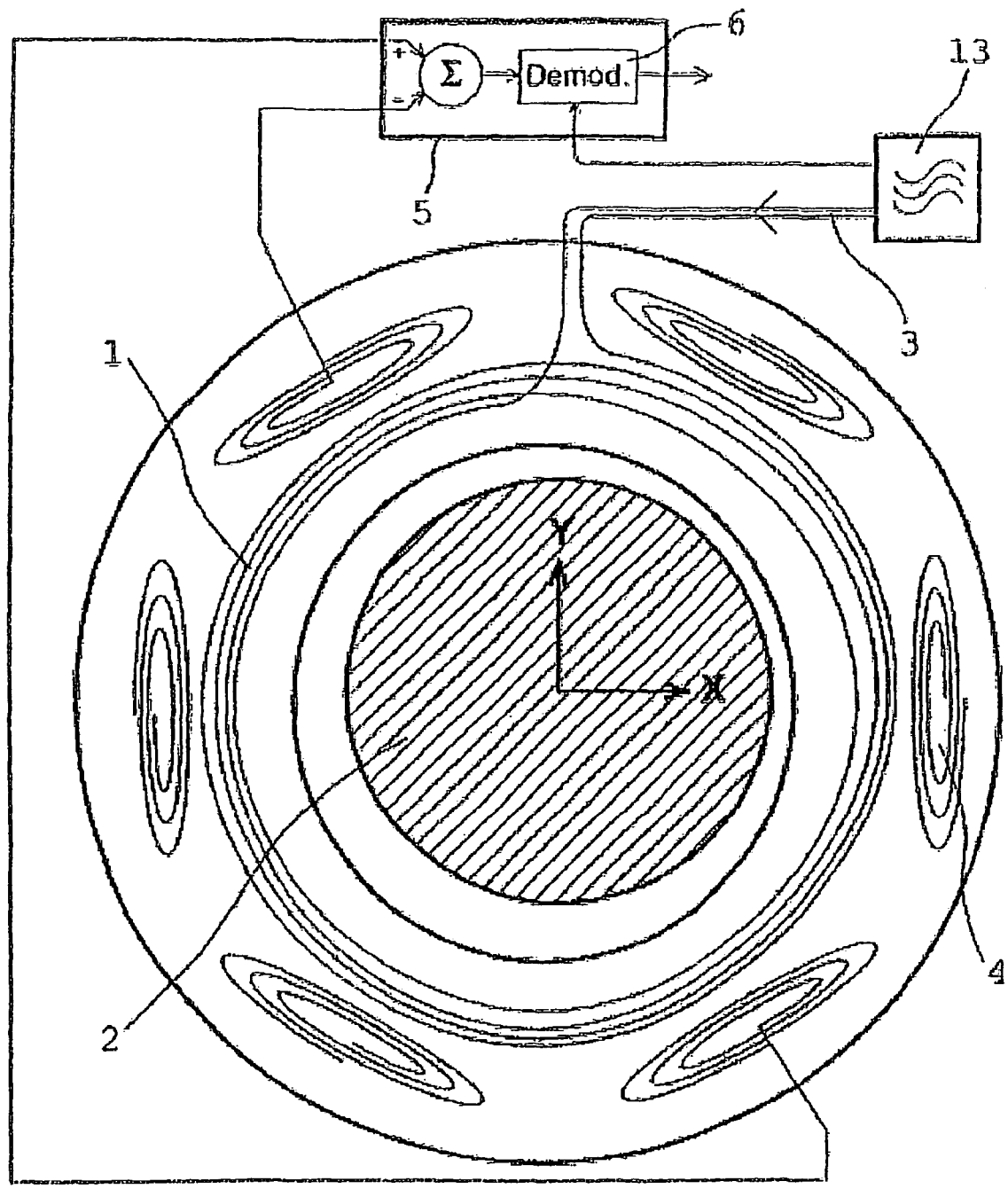
Figure 5:
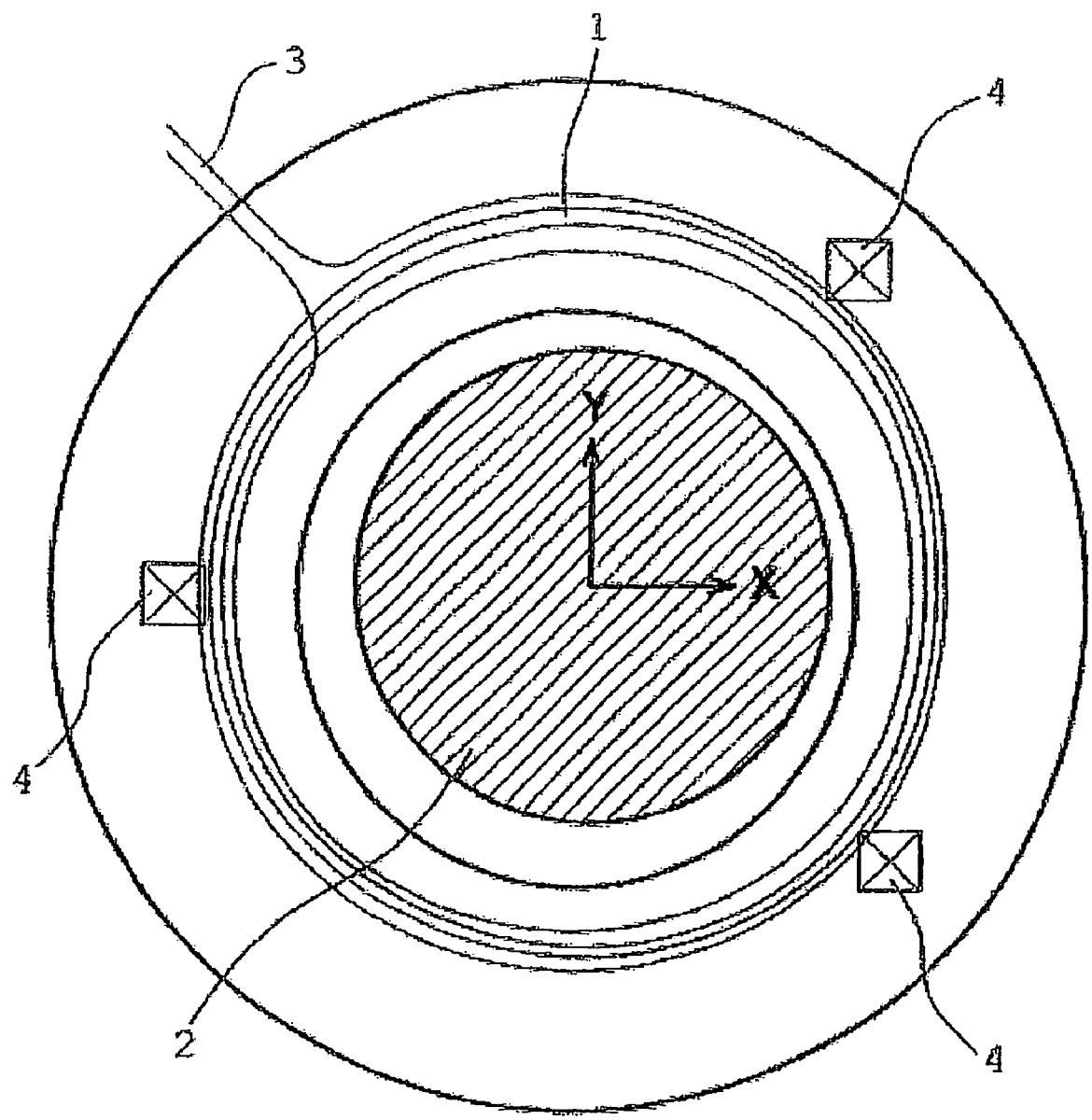
Figure 6:
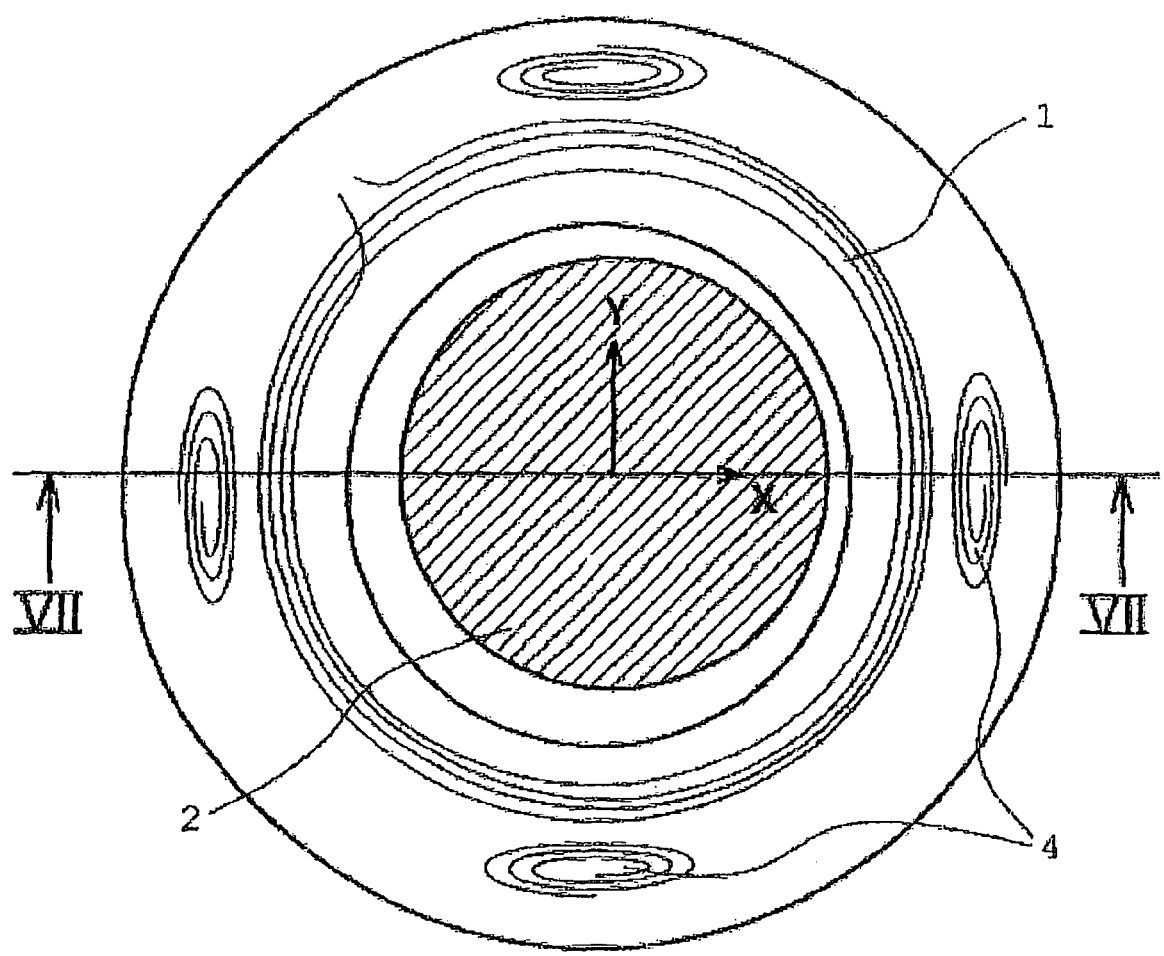
Figure 7:
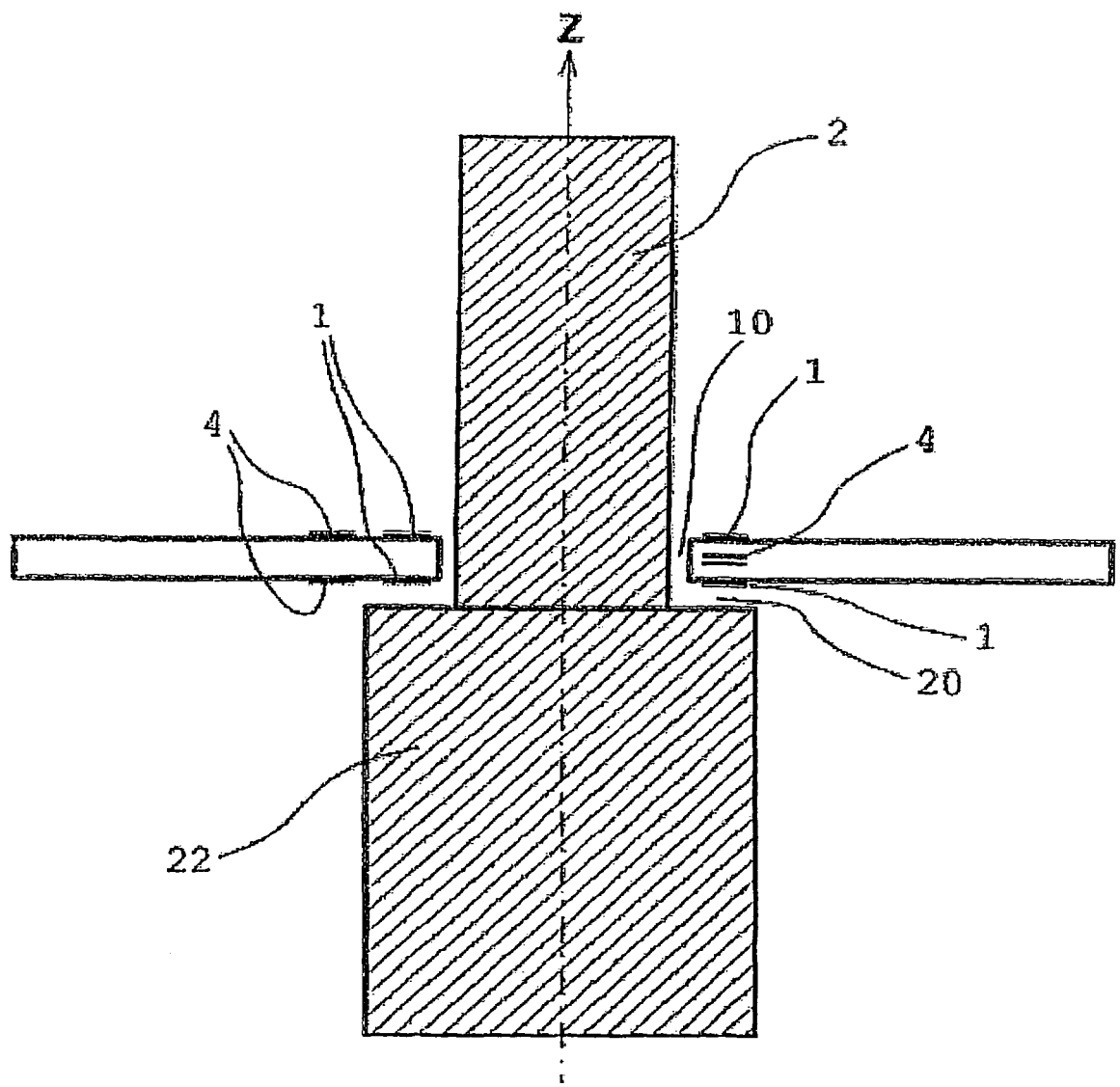
Figure 8:
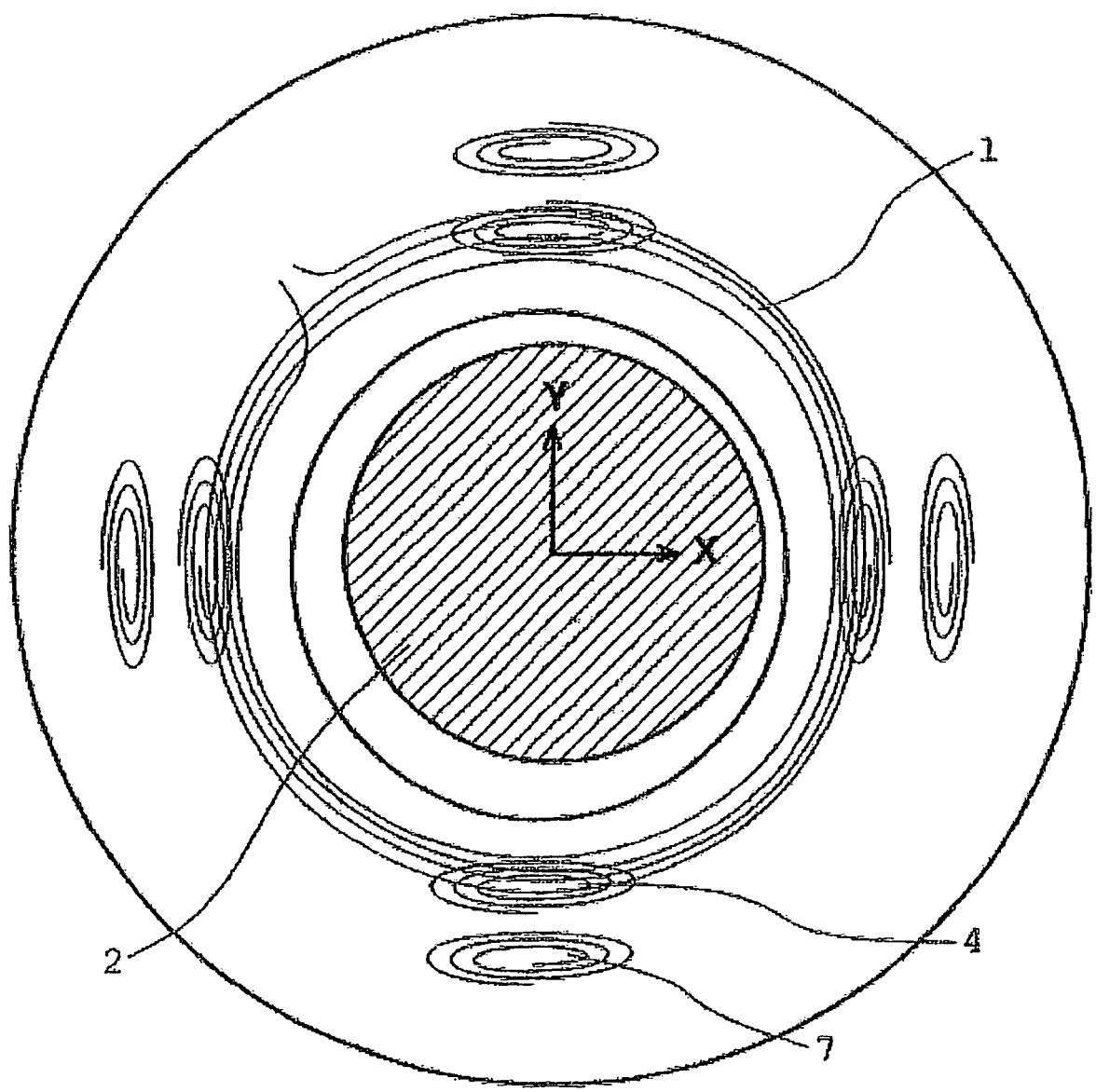
Figure 9:
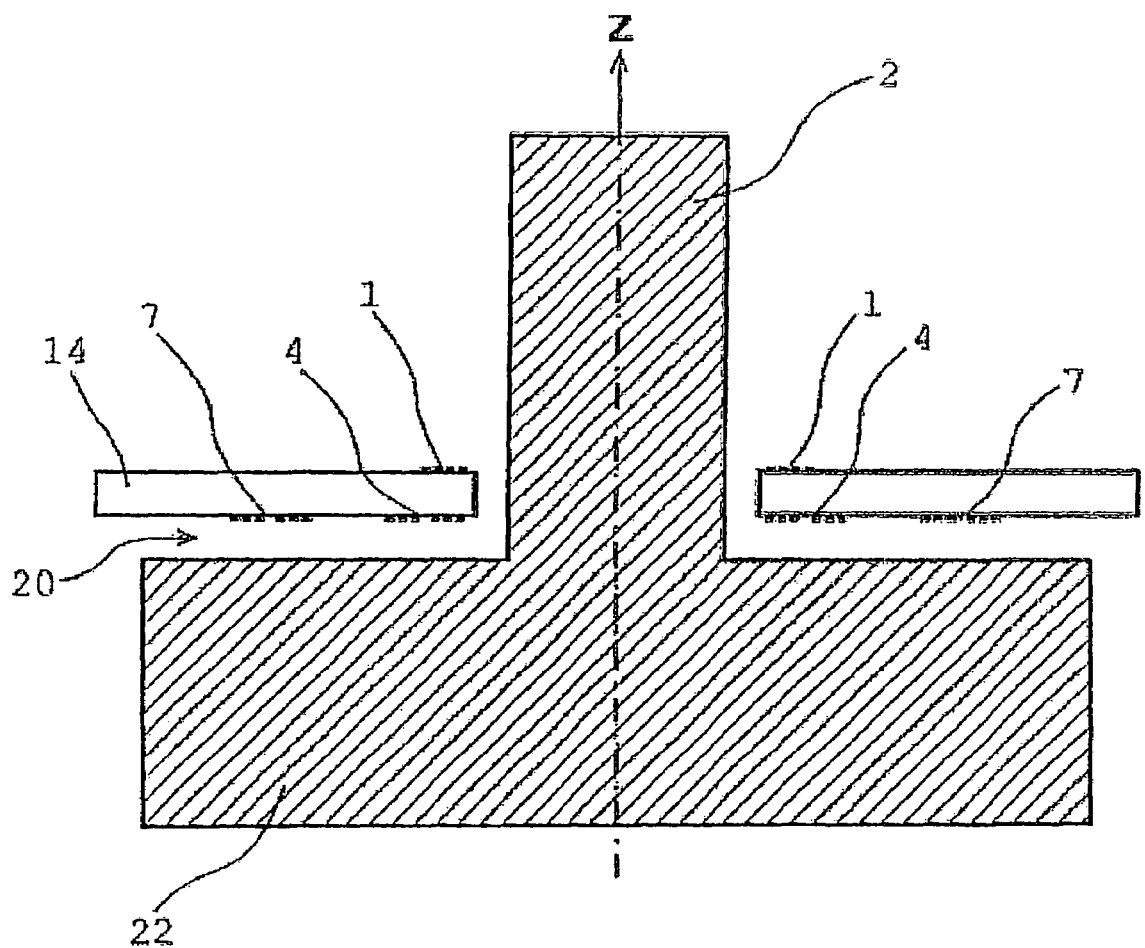
Figure 10:
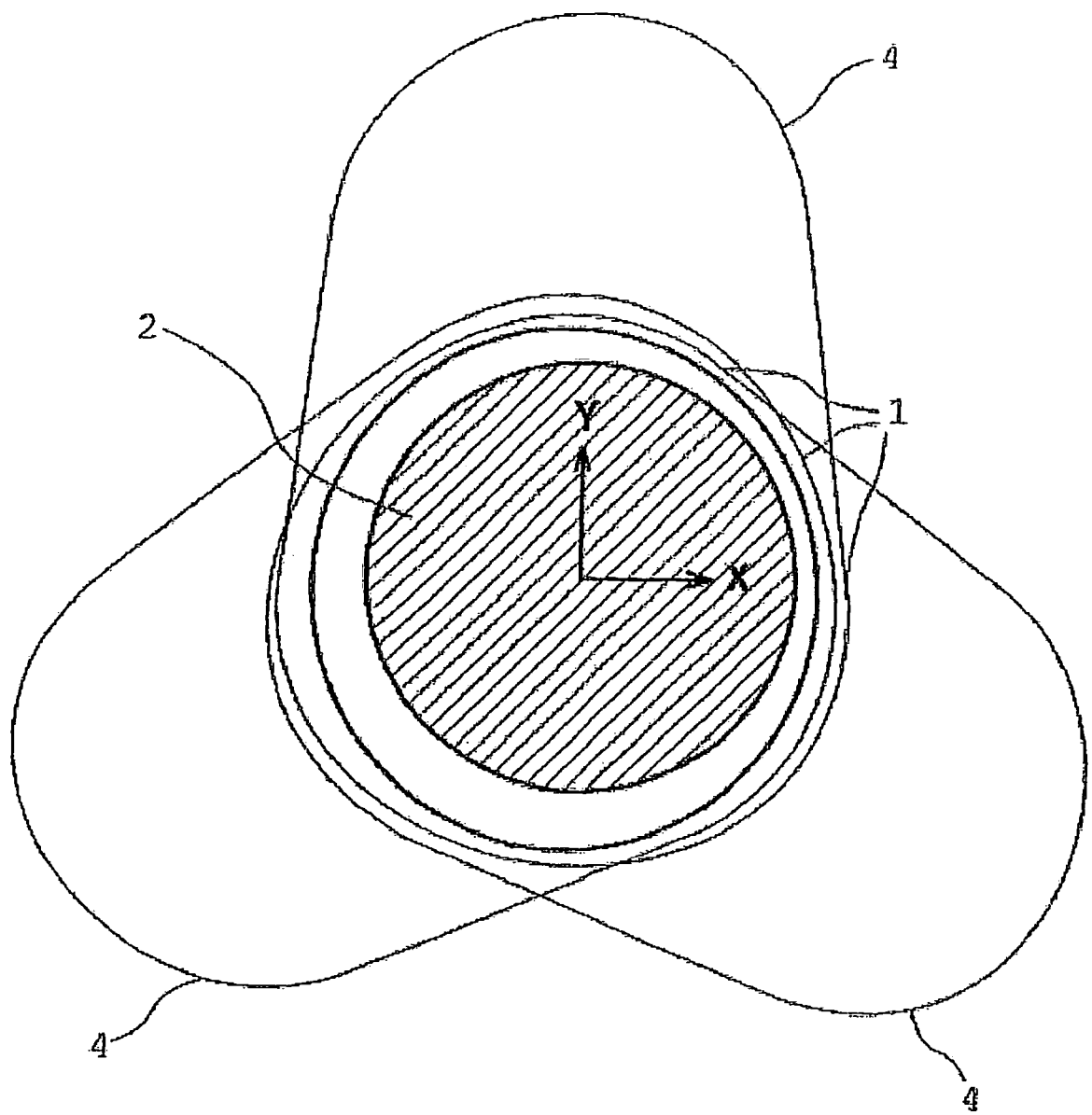
Figure 11:
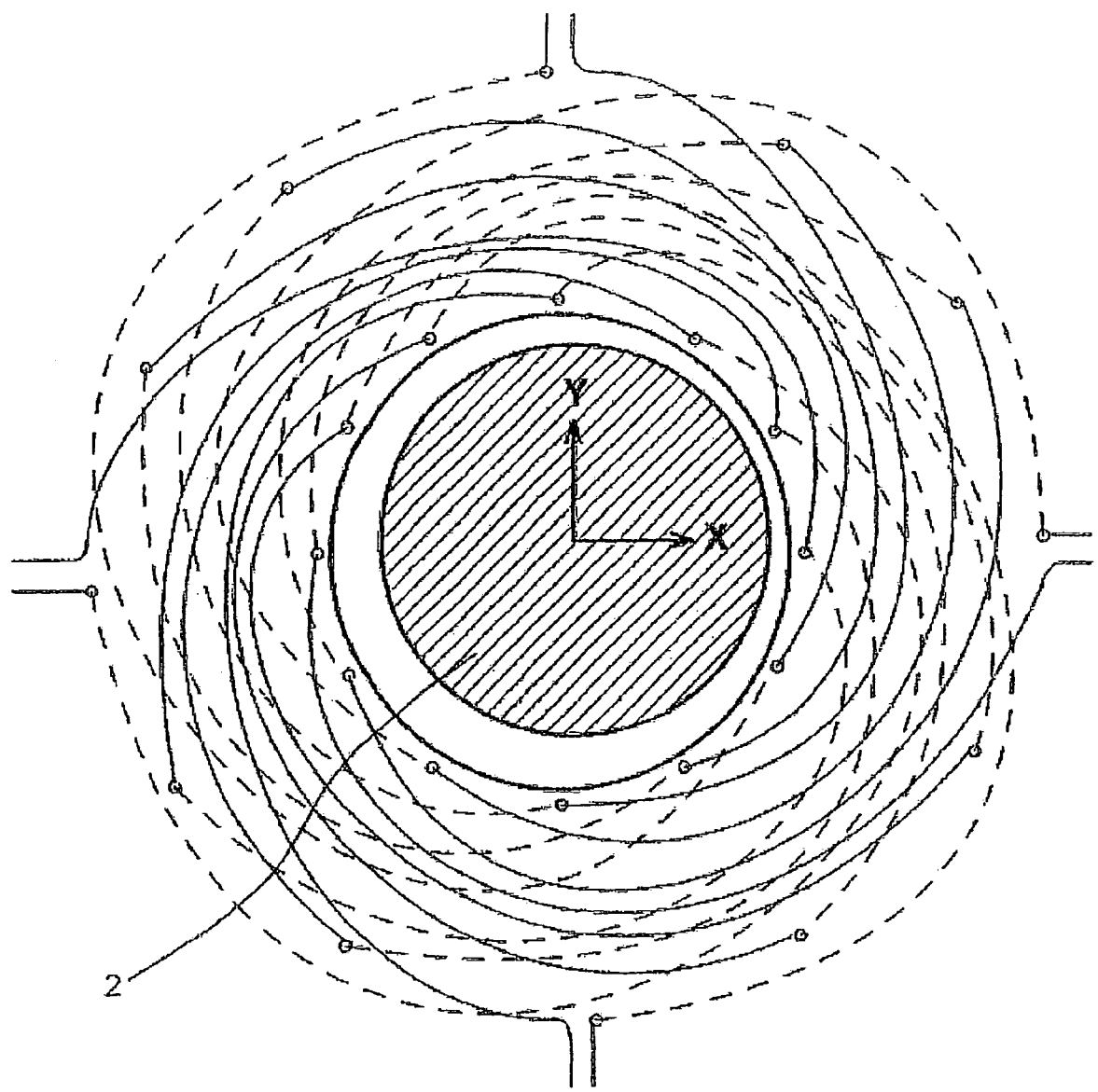

The invention will now be described in connection with exemplary embodiments shown in the drawings, in which:

FIG. 1 shows a schematic perspective view of a first configuration of a device according to the invention, FIG. 2 shows a schematic plan view of the device according to FIG. 1, FIG. 3 shows a schematic plan view of a second configuration of a device according to the invention, FIG. 4 shows a schematic plan view of a third configuration of a device according to the invention with a signal treatment arrangement, FIG. 5 shows a schematic plan view of a fourth configuration of a device according to the invention, FIG. 6 shows a schematic plan view of a fifth configuration of a device according to the invention, FIG. 7 shows a schematic sectional side view of the device according to FIG. 6, FIG. 8 shows a schematic plan view of a sixth configuration of a device according to the invention, FIG. 9 shows a schematic sectional side view of the device according to FIG. 8, FIG. 10 shows a schematic plan view of a seventh configuration of a device according to the invention, and FIG. 11 shows a wiring circuit layout of a device according to FIG. 10.

FIG. 1 shows a schematic perspective view of a first configuration of a device according to the invention. A coil 1 is wound around an electrically conductive movable target body 2 and is excited by a high frequency current through line 3 and generator 13. Target body 2 is an electrically conductive body but not made of ferromagnetic material. Differing from a conventional arrangement where small independent coils are just placed around the target body, the coil is arranged in such a way that its windings enclose the body completely. Therefore, the inductance of the coil 1 is high compared to a conventional arrangement. The field of such a coil 1 is rejected by the eddy currents induced in the conductive body 2. This leads to a field concentration in the gap 10 between movable body 2 and coil 1. The field highly depends on the gap size 10. Thus, the position of the body 2 has a large impact on the overall field distribution.

This effect does not change the electrical parameters of the coil 1 since an increased gap 11 on one side of the body is compensated by the decreased gap 12 on the opposite side. The total field is approximately constant, however, the distribution of the field varies with the body position. Magnetic field sensors 4 are used around the body 2 along the winding of the coil 1 to measure the asymmetries of the field distribution. The sensors 4 are arranged more or less in the same plane 14 of the hollow cylindrical device. The resulting arrangement has good sensitivity for small lateral target body movements (directions X and Y), is easy to manufacture, and can be operated at relatively low frequencies due to the large inductance of the coil 1.

Applicant has prepared a device according to the invention with a diameter of the body 2 of 20 millimeters. The inner edge of a substrate 14 forming the plane around the body 2 has a diameter of 21 millimeters. Therefore, according to one embodiment of the invention, the gap size 10 is 0.5 millimeters.

The embodiment is chosen and arranged in such a way that there is a relationship of 40:1 between the diameter of the body 2 and the width of the gap 10. If the body 2 moves e.g. 0.3 millimeters to the right gap 12 decreases to 0.2 millimeters, the opposite gap increases to 0.8 millimeters. Hence the magnetic field will move to the left side by about 12 millimeters.

The operation of the device is as follows. The stationary coil 1 encloses the movable target body 2 on a ring substrate 14 as near as possible to the inner circumference of the substrate 14. Such a distance may decrease down to 0.2 millimeters. A high frequency alternating current 3, typically in the range of 100 Kilohertz to 10 Megahertz, is generated in generator 13 and passed through coil 1. The benefit of this arrangement is its compactness—a large coil inductance that can be achieved using only little space. Magnetic field sensors 4 are implemented as coils. These additional coils 4, arranged around the target body 2, are used to measure the voltage induced by the high frequency field created by coil 1. These voltages depend on the target body's position and, hence, yield independent position signals for the X- and Y-directions.

The cables 3 may be long compared to the dimensions of the device, e.g. 100 to 1, and allow only relatively low frequencies.

The possible frequency range for the high frequency alternating current depends on the dimensions of the device. Said frequency has to be high enough so that a substantial part of the generated magnetic field cannot enter the conductive body 2; in other words the eddy currents induced in the conductive body 2 displace and reject the magnetic field of coil 1.

FIG. 2 shows a schematic plan view of the device according to FIG. 1. Identical features are receiving the same reference numerals throughout the drawings. Within the embodiment of FIG. 1 and 2 four coils 4 are used.

Similar arrangements yielding such position signals can also be realized by providing more and fewer sensing coils, as for example as shown in FIGS. 3 and 4. Within FIG. 3 a second configuration of a device according to the invention is using three coils 4, whereas FIG. 4 shows six coils 4.

The arrangement of coils according to the invention results in sufficiently large inductances even if the number of windings per coil is low (e.g. five turns) and if the coil size is small (e.g. 10 millimeter coil diameter). As a result, this measurement principle is suited for integration on a circuit board (PCB). Use of a circuit board also ensures the possibility to provide all coils 1 and 4 in one production step in the same plane 14 as shown in FIG. 1, allowing for a reproducible and, low cost manufacturing process as well as for an optimum coil placement. Coil 1 and coils 4 can be placed set up in as a multi-layer arrangement very close to the target body 2, yielding an even improved resolution, see FIG. 7. For all mentioned embodiments the eddy currents induced in the conductive body 2 reject the field of coil 1. The conductive body 2 is then almost without magnetic field lines. This leads to said field concentration in the gap 10 between movable body 2 and fixed coil 1.

By adding additional coils, a combination with a conventional sensor principle allows for the measurement of the distance in the perpendicular z direction.

It is possible to use a ferromagnetic target body as long as the eddy current effect predominates, so that the described arrangement of inductances is still usable.

Coils 1 and 4 form a system of coupled inductances. The resulting signals can be evaluated based on measurement of the coils' impedances. This can be realized in different ways. Instead of connecting the high frequency alternating current 3 to coil 1, such currents can also be applied to coils 4, resulting in a measurable signal in coil 1. The currents applied to the coils 4 can be chosen with a phase offset to each other or with different frequencies.

Capacitors of typically some 100 Picofarad can be connected in parallel to the coils 4 and 1 to compensate for the coils' inductive reactive currents, which, hence, decreases the currents in the cables. This yields resonant circuits that strongly depend on the position of the target body 2. In the presented arrangement, the resonant frequencies become significantly lower compared to single independent coils due by the coupling of the inductances. Both, lower currents and lower frequencies are favorable for signal transmission by the cables connected to the arrangement.

FIG. 4 shows a schematic plan view of a third configuration of a device according to the invention with a signal treatment arrangement. The processing of the signals through arrangement 5 in FIG. 4 can be realized differentially in order to eliminate sensor drift. Furthermore, a known synchronous demodulation 6 can be used. However, we have to note that a plurality of different processing means and methods of treatment of the signals are available from prior art. The signal processing arrangement 5 is preferably integrated on the substrate together with the coils 1 and 4. However, it has to be noted that the small sensitivity of the feeding line 3 and measurement line permits the separation of the sensor and its signal processing arrangement.

Instead of the coils 4, also other magnetic field sensors, like for example such as hall sensors can be used. FIG. 5 shows a schematic plan view of a fourth configuration of a device according to the invention with three magnetic field sensors, using hall sensors 4 instead of coils.

FIG. 6 shows a schematic plan view of a fifth configuration of a device according to the invention, and FIG. 7 shows a schematic sectional side view of the device according to FIG. 6 according to line VII-VII in FIG. 6. Within the embodiment of FIG. 6 the axial target body's position in Z-direction can be additionally determined by measuring the distance (or gap) 20 to a step or a notch 22 on the target body 2. In this arrangement distance measurement can be achieved by evaluating the sum of the signals of coils 4 or by evaluating the impedance of coil 1. FIG. 7 actually shows two different embodiments within one drawing. On the left hand side of FIG. 7 the coil 1 is prepared on the innermost circumference on and below a substrate and the coil 4 is prepared in the same planes as coil 1 within a larger distance from the z-axis. On the right hand side of FIG. 7 a multilayer arrangement is shown, wherein coil 4 is prepared in sandwich between two parts of coil 1.

FIG. 8 shows a schematic plan view of a sixth configuration of a device according to the invention, and FIG. 9 shows a schematic sectional side view of the device according to FIG. 8. With additional coils 7 the measurement arrangement can be extended to additional degrees of freedom (DOF). FIG. 8 shows an arrangement with such additional coils 7 provided radially outside of coils 1 and 4, respectively. Within the embodiment of FIG. 8 the axial target body's position in Z-direction can be additionally determined by measuring the gap 20 to a larger cylinder part 22 of the target body 2. These coils 7 allow for evaluation of the rotation (tilting) angles about the X- and Y-axes in addition to the displacements in the X-, Y-, and Z-directions. From FIG. 9 can be seen that coils 4 and 7 are provided on the lower surface of the substrate 14 facing the larger cylinder part 22 whereas the cylindrical enclosing coil 1 is provided on the other substrate side at the inner circumference of the substrate 14.

FIG. 10 shows a schematic plan view of a seventh configuration of a device according to the invention, and FIG. 11 shows a wiring circuit layout of a device according to FIG. 10. Coil 1 consists of 4 separate windings. Each coil 4 is connected in series to the corresponding winding of coil 1. This leads to less connecting wires. FIG. 10 shows only one turn of the windings for better overview. The excitation signal 13 is fed to all coils 4 and the impedances of the coils 4 are measured. FIG. 11 shows a two layer wiring board. The solid lines show wires on the top layer, the dashed lines show wires on the bottom layer, and the dots are interconnections between the two layers.

The invention claimed is:

1. A device for contact-less measurement of distances in multiple directions of an electrically conductive body, said device comprising
   at least one first inductive element placed essentially around the electrically conductive body;
   a plurality of second inductive elements or other magnetic field sensors provided in the vicinity of said first inductive element;
   a high-frequency generator for feeding a high-frequency current to said at least one first inductive element so as to generate a high-frequency magnetic field, said high-frequency current having a frequency high enough for a substantial part of said high-frequency magnetic field to not be able to enter said conductive body due to eddy currents being formed in said conductive body; and
   a signal processing arrangement for detecting output signals from said second inductive elements or other magnetic field sensors, said signal processing arrangement being adapted for detecting, in response to a movement of said conductive body in a first direction, a movement of said high-frequency magnetic field in a second direction opposite to said first direction in consequence of said eddy currents.

2. The device according to claim 1, wherein the first and second inductive elements are coils.

3. The device according to claim 2, wherein the second inductive elements are single coils placed at different angular positions around the body, and wherein said first inductive element is a coil wound around the body.

4. The device according to claim 2, wherein the second inductive elements are provided in an even number and wherein opposite second inductive elements are differentially coupled.

5. The device according to claim 2, wherein the second inductive elements are provided with capacitances in parallel to form resonant circuits.

6. The device according to claim 1, wherein the body comprises a flange part and wherein further single coils are placed at different angular positions around the body in vicinity of the surface of the flange part.

7. Use of the device according to claim 1 for angle detection of a joystick, a steering gear, a rotor of a motor, or computer input means.

8. Use of the device according to claim 1 for controlling the position of a magnetic bearing.

9. The device of claim 2, wherein said coils are printed coils.

10. The device of claim 1, wherein a gap is present between the body and the first inductive element, said gap being small compared to a diameter of said body at the gap.

11. A method for contact-less measurement of distances in multiple directions of an electrically conductive body, the method comprising:
    providing at least one first inductive element placed essentially around the electrically conductive body;
    providing a plurality of second inductive elements or other magnetic field sensors in the vicinity of said first inductive element;
    feeding a high-frequency current to said at least one first inductive element so as to generate a high-frequency magnetic field, said high-frequency current having a frequency high enough for a substantial part of said magnetic field to not be able to enter said conductive body due to eddy currents being formed in said conductive body; and
    detecting output signals from said second inductive elements or other magnetic field sensors, said output signals reflecting, in response to a movement of said conductive body in a first direction, a movement of said high-frequency magnetic field in a second direction opposite to said first direction in consequence of said eddy currents.

12. The method of claim 11, wherein an angle of a device selected from a joystick, a steering gear, a rotor of a motor, and computer input means is detected.

13. The method of claim 11, wherein a position of a magnetic bearing is controlled based on said output signals from said second inductive elements.

* * * * *